US008448120B2

(12) United States Patent
Huang et al.

(10) Patent No.: US 8,448,120 B2
(45) Date of Patent: May 21, 2013

(54) RC EXTRACTION FOR SINGLE PATTERNING SPACER TECHNIQUE

(75) Inventors: Cheng-I Huang, Hsinchu (TW); Hsiao-Shu Chao, Baoshan (TW); Yi-Kan Cheng, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/045,839

(22) Filed: May 9, 2011

(65) Prior Publication Data
US 2012/0288786 A1  Nov. 15, 2012

(51) Int. Cl.
*G06F 17/50* (2006.01)
*G06F 9/455* (2006.01)

(52) U.S. Cl.
USPC ........... 716/126; 716/113; 716/118; 716/119; 716/130; 716/134; 716/55; 716/110; 703/23

(58) Field of Classification Search
None
See application file for complete search history.

(56) References Cited

U.S. PATENT DOCUMENTS

| 5,933,759 | A | 8/1999 | Nguyen et al. | |
|---|---|---|---|---|
| 6,242,352 | B1 | 6/2001 | Chen et al. | |
| 7,231,628 | B2 * | 6/2007 | Pack et al. | 716/52 |
| 7,531,449 | B2 | 5/2009 | Park et al. | |
| 7,853,904 | B2 * | 12/2010 | White | 716/136 |
| 7,879,727 | B2 | 2/2011 | Postnikov et al. | |
| 7,906,253 | B2 | 3/2011 | Aton et al. | |
| 8,001,512 | B1 * | 8/2011 | White | 716/119 |
| 2003/0140325 | A1 | 7/2003 | Chen et al. | |
| 2009/0087619 | A1 | 4/2009 | Aton et al. | |
| 2010/0176479 | A1 | 7/2010 | Postnikov et al. | |
| 2010/0325595 | A1 | 12/2010 | Song et al. | |
| 2011/0023002 | A1 | 1/2011 | Cheng et al. | |
| 2011/0193234 | A1 | 8/2011 | Chen et al. | |
| 2011/0204470 | A1 * | 8/2011 | Cheng et al. | 257/499 |

OTHER PUBLICATIONS

Bencher, C. et al., "22nm Half Pitch Patterning by CVD Spacer Self Alignment Double Patterning (SADP)", Proc. of SPIE, 2008, 6924, pp. 69244E-1 through 7.
Notice of Co-Pending Applications with U.S. Appl. No. 12/907,640, filed Oct. 19, 2010.
M. Cho et al., Double Patterning Technology Friendly Detailed Routing, IEEE/ACM International Conference on Computer-Aided Design, pp. 506-511, Nov. 2008.
R. Kruif et al., Wafer Based Mask Characterization for Double Patterning Lithography, 24th European Mask and Lithography Conference, pp. 71-82, Jan. 2008.

(Continued)

*Primary Examiner* — A. M. Thompson
(74) *Attorney, Agent, or Firm* — Duane Morris LLP; Steven E. Koffs

(57) ABSTRACT

A method includes performing a place and route operation using an electronic design automation tool to generate a preliminary layout for a photomask to be used to form a circuit pattern of a semiconductor device. The place and route operation is constrained by a plurality of single patterning spacer technique (SPST) routing rules. Dummy conductive fill patterns are emulated within the EDA tool using an RC extraction tool to predict locations and sizes of dummy conductive fill patterns to be added to the preliminary layout of the photomask. An RC timing analysis of the circuit pattern is performed within the EDA tool, based on the preliminary layout and the emulated dummy conductive fill patterns.

18 Claims, 13 Drawing Sheets

OTHER PUBLICATIONS

K. Bubke et al., Mask Characterization for Double Patterning Lithography, Journal of Micro/Nanolithography, MEMS and MOEMS, 10 pages, Jan. 2009.

Mitra et al., RADAR: RET-Aware Detailed Routing Using Fast Lithography Simulations, Proceedings of the 42nd Design Automation Conference, pp. 369-372, Jun. 2005.

* cited by examiner

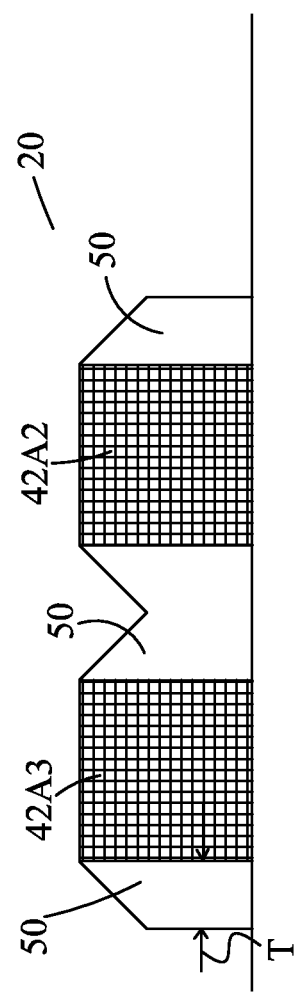

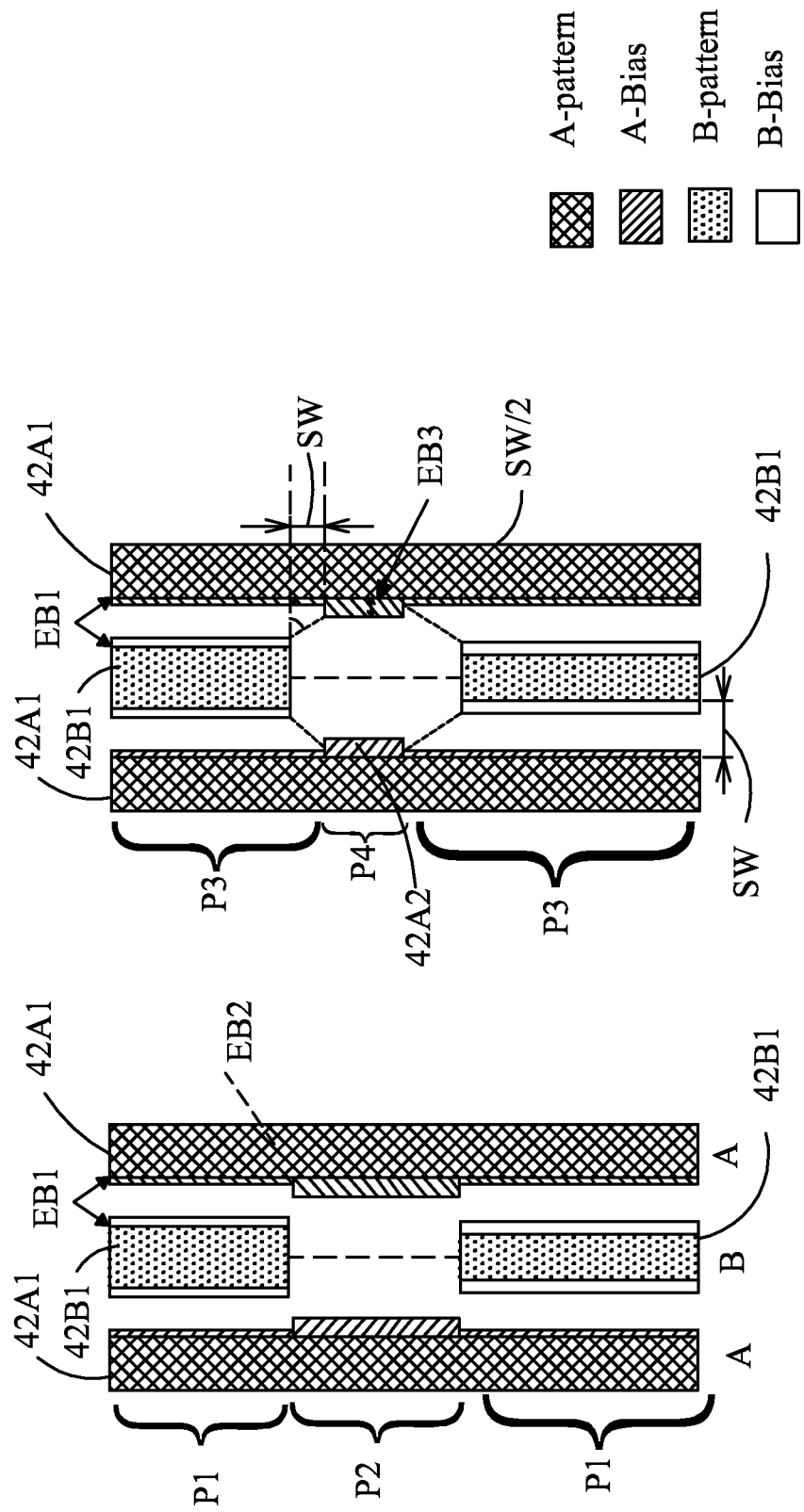

RC EXTRACTION FOR SINGLE PATTERNING SPACER TECHNIQUE

FIELD

The present subject matter relates to semiconductor fabrication generally, and more specifically to use of electronic design automation tools to fabricate small circuit geometries.

BACKGROUND

In semiconductor fabrication processes, the resolution of a photoresist pattern begins to blur at about 45 nanometer (nm) half pitch. To continue to use fabrication equipment purchased for larger technology nodes, double exposure methods have been developed.

Double exposure involves forming patterns on a single layer of a substrate using two different masks in succession on the same layer of the substrate. A set of first patterns are formed using the first mask. The patterns in the second mask are positioned so as to form second patterns that are interleaved between the first patterns formed by the first mask. As a result, a minimum line spacing in the combined pattern can be reduced while maintaining good resolution. In a method referred to as double dipole lithography (DDL), the patterns to be formed on the layer are decomposed and formed on a first mask having only horizontal lines, and on a second mask having only vertical lines. The first and second masks are said to have 1-dimensional (1-D) patterns, which can be printed with existing lithographic tools.

Another form of double exposure using two masks is referred to as double patterning technology (DPT). Unlike the 1-D approach of DDL, DPT in some cases allows a vertex (angle) to be formed of a vertical segment and a horizontal segment on the same mask. Thus, DPT generally allows for greater reduction in overall IC layout than DDL does. DPT is a layout splitting method analogous to a two coloring problem for layout splitting in graph theory. The layout polygon and critical space are similar to the vertex and edge of the graph respectively. Two adjacent vertices connected with an edge should be assigned different colors. Only two "color types" can be assigned. Each pattern on the layer is assigned a first or second "color"; the patterns of the first color are formed by a first mask, and the patterns of the second color are formed by a second mask. A graph is 2-colorable only if it contains no odd-cycle and loop. Although DPT has advantages, it is computationally intensive.

When two different photomasks are used to pattern the same layer, misalignment of patterns can occur.

BRIEF DESCRIPTION OF THE DRAWINGS

FIG. 2E is a cross section taken along section line 2E-2E of FIG. 2B.

FIGS. 4D and 4E are schematic representations of data included in two etching tables input to the RC extraction tool.

DETAILED DESCRIPTION

Figure 1:
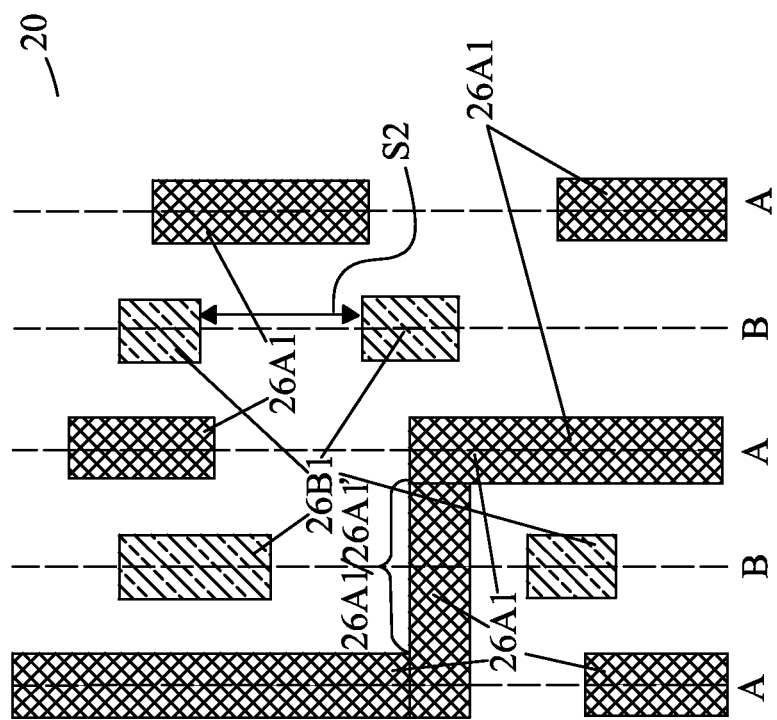
FIG. 1 shows a layout having first and second pluralities of patterns sufficient to form a plurality of desired connections, in accordance with an embodiment of the invention.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

U.S. patent application Ser. No. 12/907,640, filed Oct. 19, 2010, is incorporated by reference herein in its entirety. A double patterning technology using a Single-Patterning Spacer Technique (SPST) is described therein.

FIG. 1 shows a plurality of first patterns (A patterns) 26A1 and second patterns (B patterns) 26B1 that are generated by a placing and routing tool, and are desired to be formed on a substrate 20. The substrate 20 may be a semiconductor wafer 20. For example, these patterns 26A1, 26B1 may be formed in a back end of line (BEOL) inter-layer dielectric (ILD) layer of an integrated circuit (IC) formed on the wafer 20. The patterns 26A1, 26B1 comprise functional portions that are desired, for example, to connect two or more other circuit elements or portions (not shown) to each other. For example, the patterns 26A1 may connect conductive vias (not shown) that carry signals to or from circuits in the active layers of the substrate or other interconnect layers or to bond pads to be formed over the substrate 20.

Figure 2A:
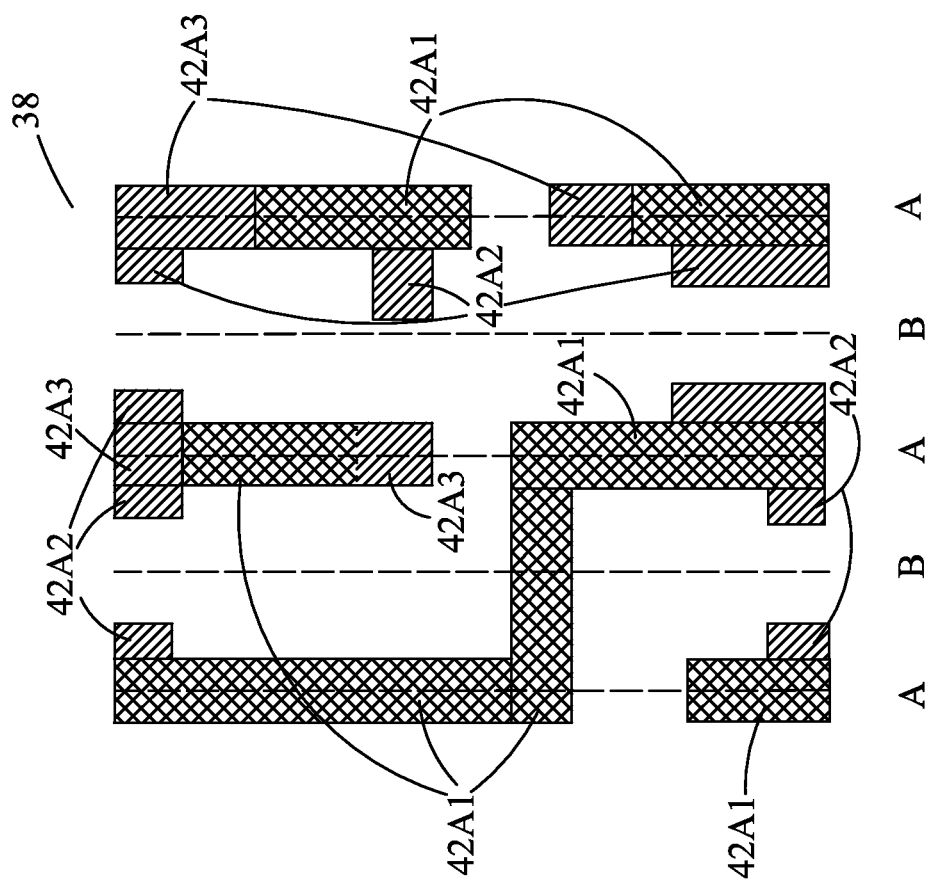
FIG. 2A shows a photomask having a layout of the first plurality of patterns, with dummy patterns added.
Figure 2B:
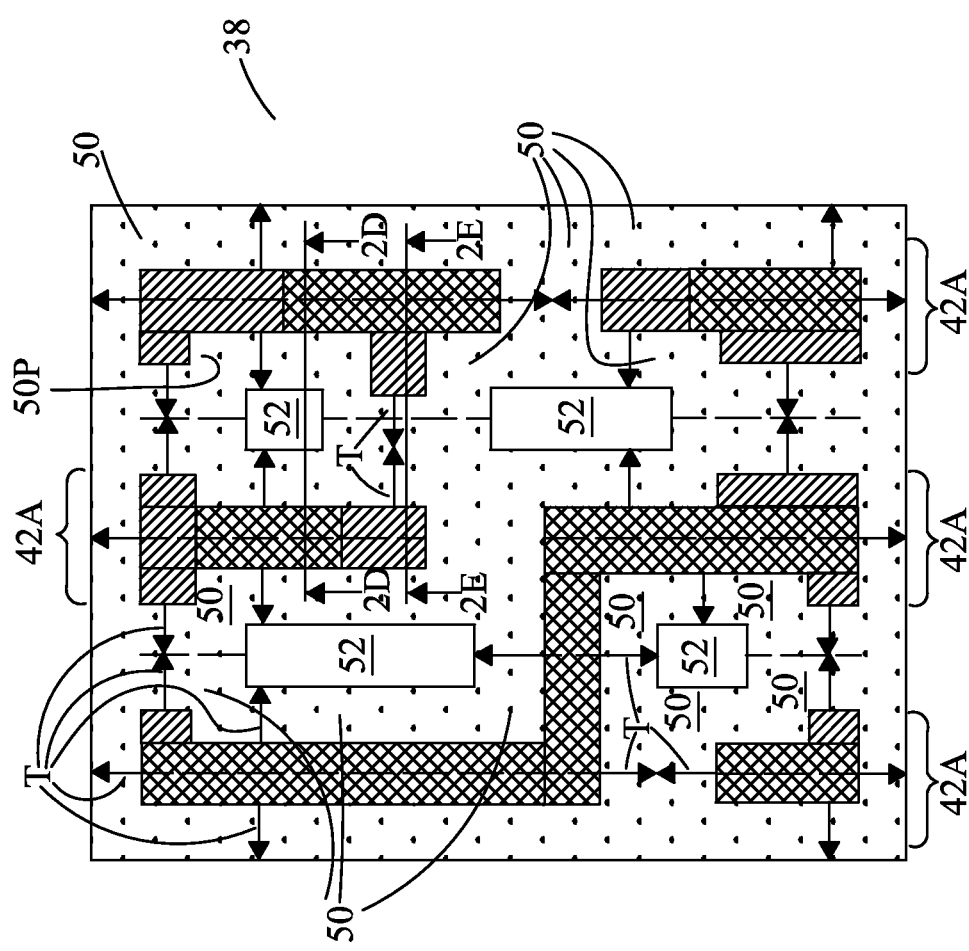
FIG. 2B shows a substrate having the first plurality of patterns and sidewall spacers formed on it.
Figure 2C:
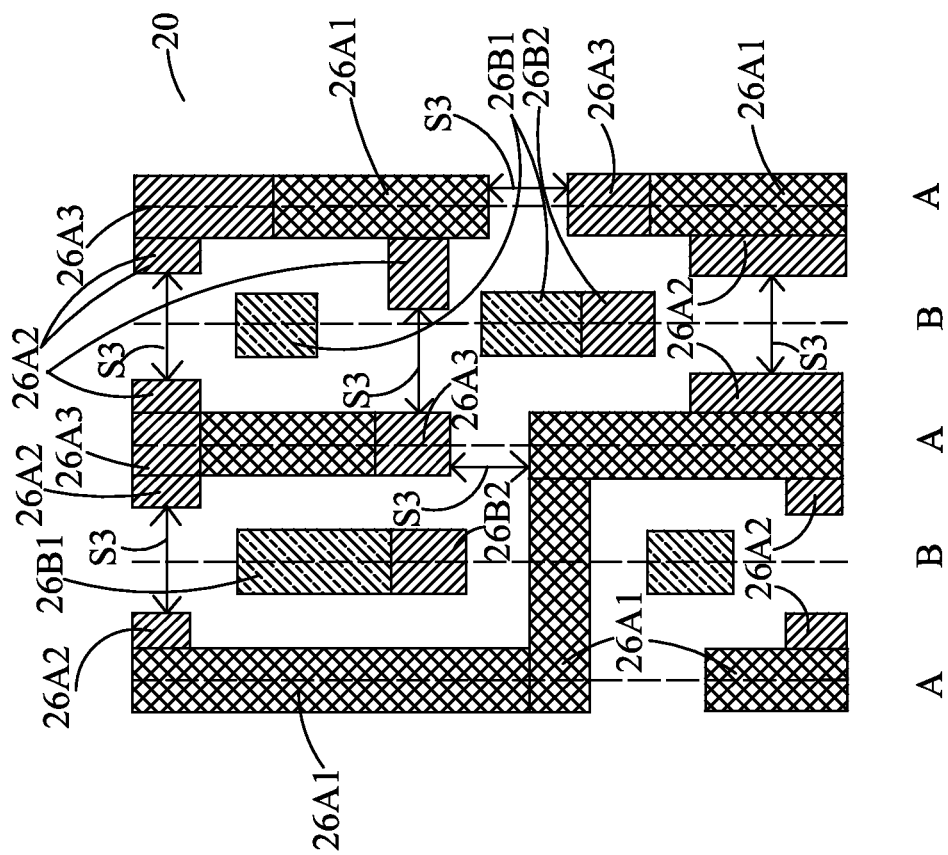
FIG. 2C shows the substrate with the second plurality of patterns formed thereon.

FIGS. 2A-2C show three steps in the performance of an SPST method. In the SPST method, a plurality of tracks, labeled "A tracks" and "B tracks" are laid out in an alternating pattern. In some embodiments, the A tracks may be spaced apart from each other by a minimum distance for forming clear patterns with a single exposure of a single photomask at a given technology node (without using a double patterning technique). Thus, an adjacent A track and B track are closer to each other than the minimum distance. In some embodiments described below, the B tracks are midway between the A tracks, and the spacing between A tracks is uniform.

FIG. 2A shows a plurality of first patterns (A patterns) 42A formed on a photomask 38. The A patterns 42A are to be patterned onto a substrate 20 using a photolithographic process. Patterns 42A comprise portions 42A1, 42A2 and 42A3. The patterns 42A1 comprise functional portions that are desired to connect two or more other circuit elements or portions (not shown) to each other. Patterns 42A1 correspond to the desired A patterns 26A1 shown in FIG. 1. The router also lays out the locations of the B patterns 42B1, but in the SPST method, the B patterns are not included in the photomask 38.

Additional dummy A patterns 42A2, 42A3 are formed on the mask 38, and patterned onto the substrate 20. The dummy A patterns 42A2, 42A3 may be inserted by a semiconductor foundry for ease of fabrication. For example, dummy A patterns 42A2, 42A3 may be inserted for purpose of defining the boundaries of spacers 50 (FIG. 2B) that are subsequently used as a hardmask for forming the B patterns 26B1, 26B2 (FIG. 2C). Some of the dummy A patterns 42A3 extend along the longitudinal axis of the A patterns 42A1. Other dummy patterns 42A2 extend in a perpendicular direction from the A patterns 42A1 and/or the dummy A patterns 42A3. These perpendicular dummy patterns 42A2 are also referred to herein as "breaker patterns". In the particular example of FIGS. 2A-2C, the dummy patterns 42A2, 42A3 are all provided for defining the hardmask 50 to form the B patterns.

Although FIGS. 2A-2C show the A patterns 42A1 and dummy A patterns 42A2, 42A3 as distinct regions, all of the patterns shown in FIG. 2A may be formed on a single photomask 38 and patterned on a single layer of the semiconductor substrate 20 in a single exposure and etch operation. Patterns 42A1, 42A2, 42A3 in the photomask 38 are indistinguishable from each other, and all appear as continuous patterns that are subjected to the same processing.

FIG. 2B shows the layout of the A patterns 42A1, 42A2, 42A3 after they are transferred to the substrate 20. In some embodiments, the patterns 42A1, 42A2, 42A3 are formed by etching trenches in the surface of the ILD material, depositing a conductive material (e.g., copper) in the trenches, and planarizing the surface, using chemical mechanical polishing (CMP). The ILD material can then be etched back, so that at least a portion of the patterns 42A1, 42A2, 42A3 extends above the substrate 20. A conformal layer of silicon oxide, silicon nitride, or silicon oxynitride is formed over the patterns and the exposed ILD surface. The conformal layer is etched back using an anisotropic etch (e.g., dry etch) to form sidewall spacers 50 adjacent to the patterns 42A1, 42A2, 42A3. These sidewall spacers 50 merge to cover the entire region of the substrate, except in the regions 52 which coincide with the planned locations of the B patterns. The spacers 50 thus form a hardmask for depositing the B patterns.

Figure 2D:
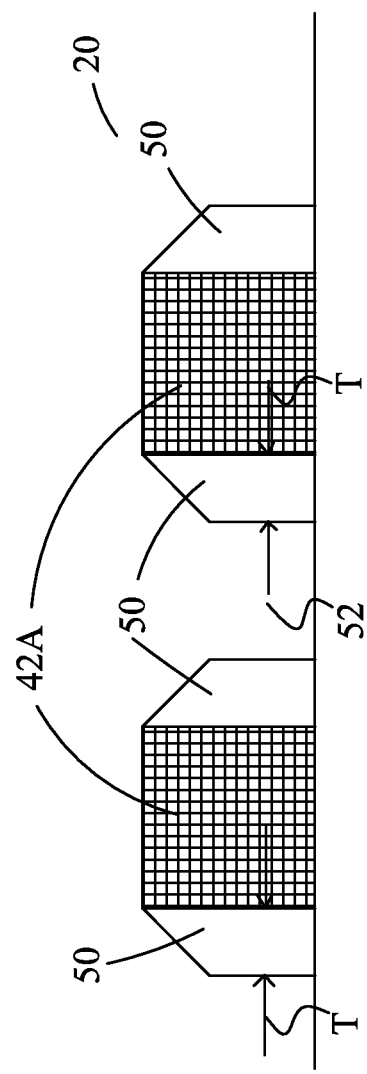
FIG. 2D is a cross section taken along section line 2D-2D of FIG. 2B.

FIGS. 2D and 2E are cross sectional views taken along section lines 2D-2D and 2E-2E in FIG. 2B. FIG. 2D shows that the thickness T of the spacers 50 defines a region 52 sized to match the desired line width of the B patterns. In FIG. 2D, the distance between the two patterns 42A is greater than twice the thickness T of the spacers 50, so that an empty region 52 is formed between the two spacers 50. For example, given a distance AA between adjacent tracks, a width $W_A$ of the A patterns, and a width $W_B$ of the B patterns, the thickness T of the conformal layer may be $0.5*(AA-W_B-W_A)$.

FIG. 2E shows two A patterns formed in a region where no B pattern is to be formed. The distance between the two patterns 42A3 and 42A2 in FIG. 2E is less than or equal to twice the thickness T of the spacers 50, so that the spacers merge to form a continuous mass of spacer material between patterns 42A3 and 42A2.

The regions 52 are then filled with a conductive material (e.g., copper) and the top surface is again planarized to form the B patterns in the locations of the regions 52, as shown in FIG. 2C.

FIG. 2C shows the layout of the conductive material as finally formed on the substrate 20, including A patterns 26A1, 26A2, 26A3 and B patterns 26B1, 26B2. Although various portions 26A1, 26A2, 26A3, 26B1, 26B2 of the patterns are given different designations and cross hatching, the A pattern portions 26A1, 26A2, 26A3 are all indistinguishable from each other, and the B pattern portions 26B1, 26B2 are indistinguishable from each other.

The patterns 26A1, 26A2, 26A3 on the substrate 20 correspond to the patterns 42A1, 42A2, 42A3 in the photomask 38 as described above, and their description is not repeated for brevity. The B patterns include the desired patterns 26B1 as shown in FIG. 1, and additional dummy portions 26B2. The dummy B portions 26B2 do not affect the function or connections of the B patterns. The dummy portions 26B2 may be added to the layout by the foundry to simplify the formation of the hardmask 50 for forming the B patterns.

In other embodiments (not shown), additional dummy A portions 26A2, 26A3 may be formed to change the shape of the hardmask 50, so that the B patterns 26B1 can be formed without also forming the dummy B patterns 26B2. The choice of adding dummy A and/or dummy B patterns can be made by the foundry to simplify the fabrication without affecting function of the IC.

The pattern generator files are then used to produce patterns called photomasks masks by an optical or electron beam pattern generator.

Figures 3A, 3B:
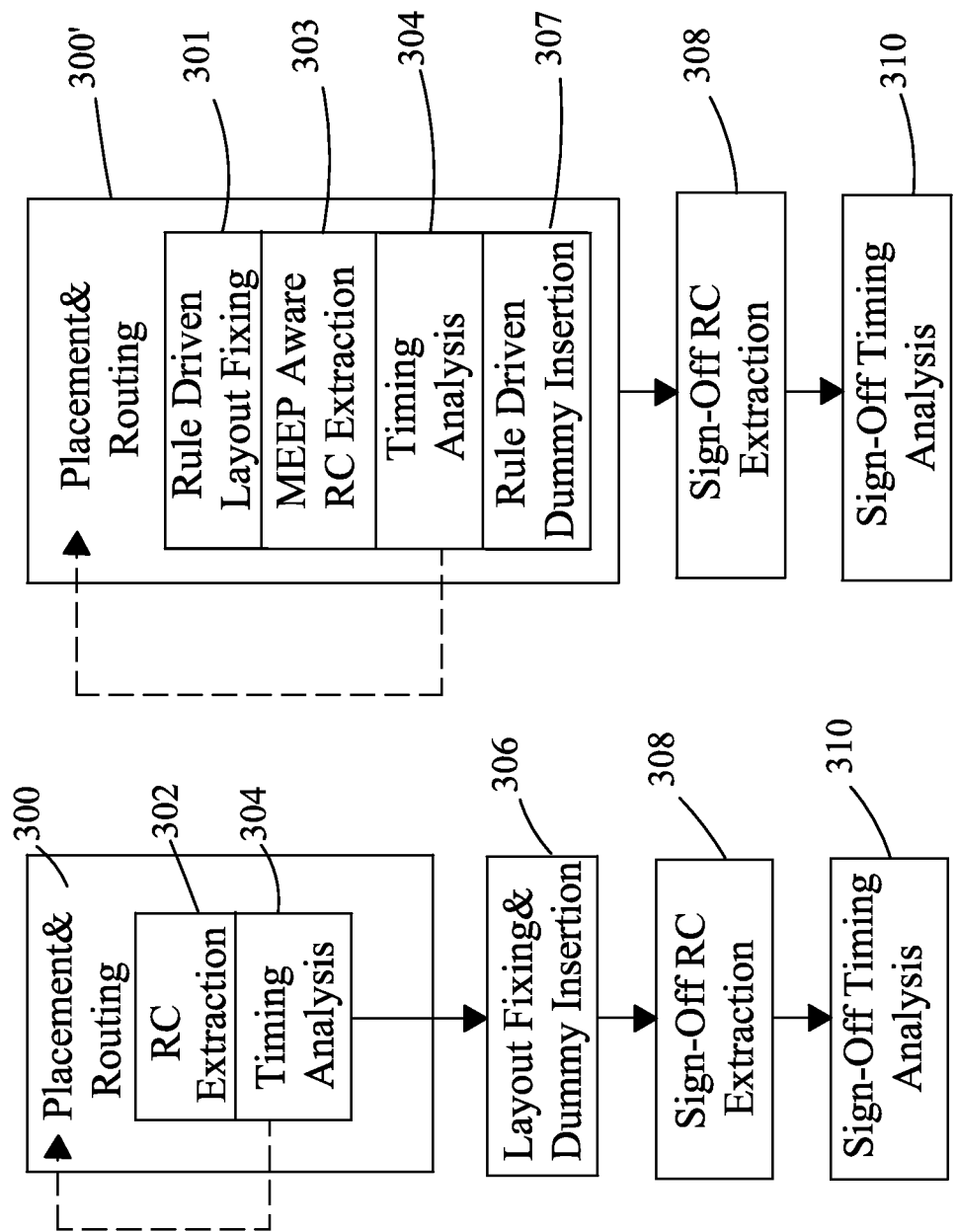
FIG. 3A is a diagram of a layout and RC extraction method.
FIG. 3B is a diagram of another layout and RC extraction method.

FIG. 3A is a flow chart of a method of layout and timing analysis for the patterns shown in FIG. 1, using electronic design automation (EDA) tools.

Block 300 is a place and route tool, and may be a commercially available tool, for example. The tool performs placement, which determines the location of each active element of the IC containing the patterns of FIG. 1. After placement, the routing step adds wires needed to properly connect the placed components while obeying all design rules for the IC. This placement and routing may be performed by a "fabless" designer, for example.

Block 302 is the RC extraction block. After the candidate layout of FIG. 1 is complete, it is then checked to ensure that it meets the design requirements before converting the design files into pattern generator files. For example, analysis is performed on the circuit design of FIG. 1 to obtain capacitance and resistance for specific geometric descriptions of conductors in the design, creating an estimation of the capacitance and resistance from a process which is called parasitic resistance and capacitance (RC) extraction. The place and route tool 300 includes an RC analysis engine having software and hardware that translates a geometric description of conductor and insulator objects, or other shapes described in a candidate IC design file or database, to associated parasitic capacitance values.

Block 304 performs a timing analysis of the circuitry of FIG. 1, based on the RC extraction data. The place and route tool 300 includes a timing analysis engine that evaluates whether the circuitry of FIG. 1 meets timing specifications. If the specifications are not met, then the place and route tool repeats the place and route step, RC extraction 302 and timing analysis 304 one or more times, until the timing analysis of the circuitry of FIG. 1 meets specifications.

When all functional and timing requirements are satisfied by the design, the design is complete, and may be turned over for final sign-off check. With increasing frequency, the design of FIG. 1 is then provided to an IC foundry to fabricate the ICs.

Block 306 performs layout fixing and dummy insertion. This function may be performed by an independent integrated circuit foundry, for example. Each foundry uses its own particular variations of the fabrication technology. For example, the foundry may have its preferred techniques for implementing double patterning and/or optical proximity correction (OPC). Thus, in block 306, the foundry may provide the design service or provide the utility to help adding dummy patterns 42A2 and 42A3 to the design of photomask 38 (which subsequently result in addition of the dummy patterns 26B2 to the IC). One of ordinary skill in the art understands that any dummy patterns (not shown) added to the photomask for OPC purposes are intended to return the final circuit patterns to their as-designed configuration, and do not effect the RC timing analysis (i.e., OPC dummy patterns appear on the mask, but do not substantially appear in the IC). However the addition of dummy patterns 42A2, 42A3 actually results in the formation of additional patterns 26A2, 26A3 on the substrate. Thus, the final patterns 26A1, 26A2, 26A3 (including dummies) on the substrate are different from the patterns 42A1 (without dummies) that were analyzed by the timing analysis block 304 within the place and route tool 300. Similarly, when the B patterns are subsequently formed on the substrate 20, they include the dummy B patterns 26B2, which are not reflected in the RC extraction and timing analysis performed by the place and route tool 300.

Thus, at blocks 308 and 310, the final RC extraction sign off and timing analysis signoff are based on the patterns of FIG. 2C (including the dummy patterns 26A2, 26A3 and 26B2). Because the designer had optimized its design based on its timing analysis of the patterns 26A1, 26B1 of FIG. 1, the modified layout as shown in FIG. 2C may not satisfy all timing requirements. Then further optimization iterations, through Block 300, Block 306, Block 308 and Block 310 are required.

FIG. 3B is a flow chart of a method for using electronic design automation (EDA) tools to lay out the desired circuitry of FIG. 2C in an automated manner that allows the RC extraction engine inside place and route tool to predict/emulate the dummy patterns 26A2, 26A3 and 26B2 in the design prior to the RC extraction and timing analysis. Further, the layout of the original patterns 42A1, 42B1 by the router is constrained by a set of SPST friendly routing rules, so as to generate a layout from which the RC extraction engine 302 can predict the RC characteristics of the final circuit as shown in FIG. 2C. This can be accomplished using the designer's existing EDA tool, through a modified set of (SPST friendly) design rules.

The SPST friendly design rules constrain the spacings among the various patterns 26A1 and 26B1 in the designer's place and route process, so that the longitudinal dummy pattern segments 26A3 and 26B2 can be created by place and route tool directly. In addition, the perpendicular (breaker) dummy patterns 26A2 can be emulated by RC extraction engine. This will cause the RC extraction to account for the breaker patterns 26A2.

Block 300' is the placement and routing block. The place and route operation uses an electronic design automation tool to generate a preliminary layout for a photomask to be used to form a circuit pattern of a semiconductor device, the place and route operation being constrained by a plurality of single patterning spacer technique (SPST) routing rules;

The SPST routing rules cause alternating first tracks and second tracks to be laid out, and first and second patterns to be laid out along the first and second tracks respectively, such that the first patterns are to be included in the photomask, and the second patterns are to be excluded from the photomask but defined between spacers, the spacers to be formed adjacent the circuit pattern formed using the first patterns of the photomask.

Block 301 includes rule driven layout fixing which can be implemented using a commercially available place and route tool during the designer's place and route optimization, configured to include the SPST friendly design rules described below. The router is given design rules which constrain the allowable spacings among the patterns 26A1 and 26B1 to lengths which simplify their computation according to a predetermined rule, and cause the router to create the dummy patterns 26A3 and 26B2 for purpose of the RC analysis and timing analysis.

Block 303 provides SPST aware RC extraction within the place & route tool. The inputs to the RC extraction include the router output based on the SPST friendly design rules. As noted above, these rules cause the router to provide spacings among the patterns 26A1 and 26B1 such that the dummy patterns 26A3 and 26B2 automatically created by the router before the RC extraction. Also, the length and width of the breaker patterns 26A2 is predicted.

Block 304 performs the timing analysis within the designer's EDA tool, based on the RC analysis as modified above, to account for the dummy patterns 26A2, 26A3 and 26B2. The designer's EDA tool 300' thus performs a timing analysis tool that evaluates whether the circuitry of FIG. 2C meets timing specifications. If the specifications are not met, then the place and route tool repeats the place and route step 300', RC extraction 303 and timing analysis 304 one or more times, until the timing analysis of the circuitry of FIG. 2C meets specifications.

Block 307 provides rule driven dummy insertion. This insertion of the dummy patterns may be performed after the design is complete. Because the SPST friendly design rules are used, the dummy patterns inserted in block 307 are substantially the same as those predicted by the RC extraction engine during the RC extraction analysis. As noted above, the design rules to the router constrain the spacings among patterns 26A1 and 26B1. Thus, the actual timing for the A patterns, including the dummy patterns 26A2, 26A3 inserted in the A pattern mask 38, and the B patterns, including the dummy patterns 26B2, will more closely match the RC timing analysis performed in place & route stage.

Blocks 308 and 310 provide the final sign off of RC extraction and timing analysis, respectively, as is provided in FIG. 3A. Because the SPST friendly design rules allow the place and route tool to predict the dummy patterns of FIG. 2C, the final sign off RC extraction 308 and final sign off timing Analysis 310 can provide substantially the same result as the place and route tool's RC extraction 303 and timing analysis 304.

Figure 4A:
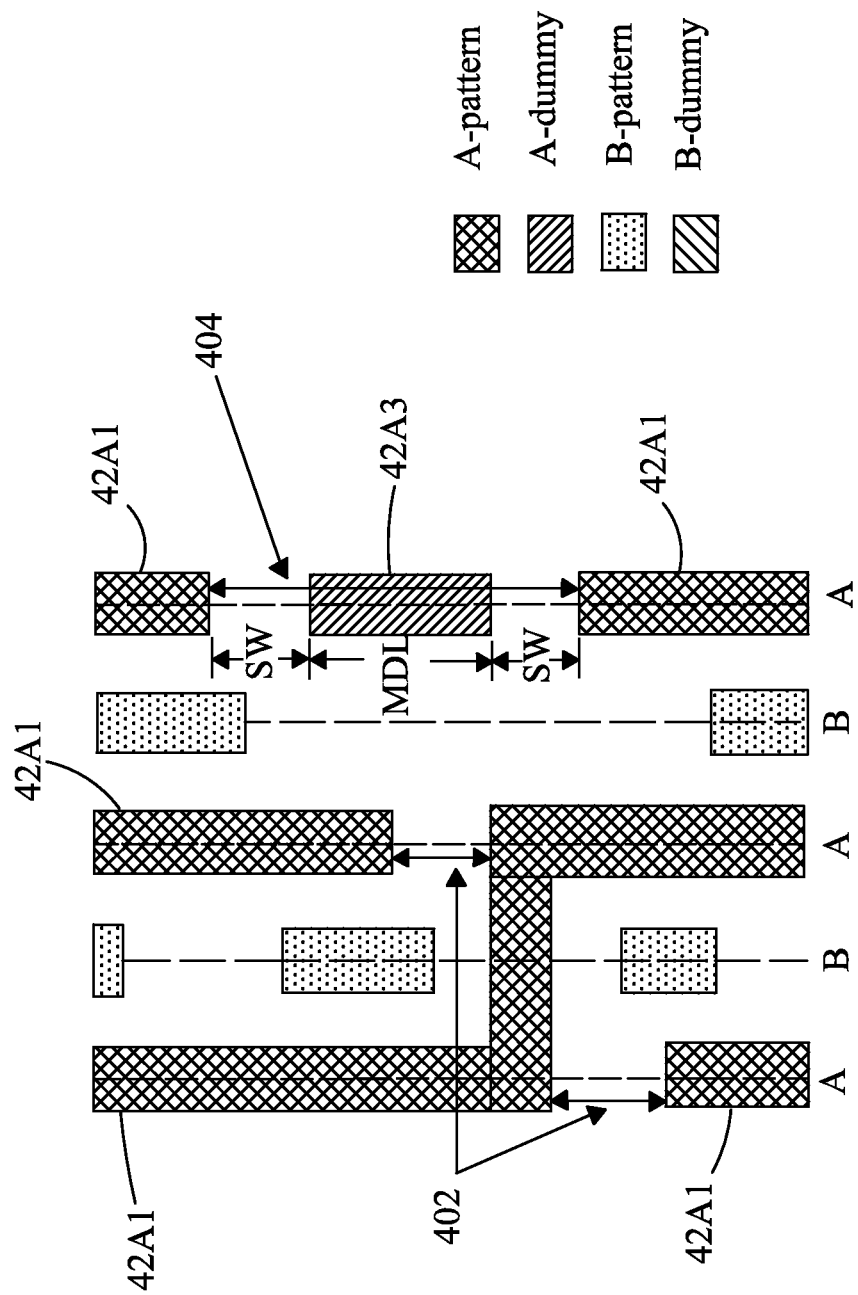
FIG. 4A is a diagram of the calculation of an end-to-end routing rule for A patterns.

FIG. 4A is a diagram showing the operation of an SPST routing rule that constrains an end-to-end distance between the first patterns 42A1 in the layout, as defined to the router. The end-to-end distance can be either: twice a width of the spacers, as shown by distance 402; or a distance 404 greater than or equal to a sum of twice a width SW of the spacers plus a minimum permitted length MDL of dummy conductive fill patterns. In other words, this router design rule prohibits the router from using an end-to-end distance that is less than the combined width of the two spacers that merge, as shown in FIG. 2E. This rule also prohibits end-to-end distances which are greater than the combined width 2*SW of two spacers, but too small to layout an A dummy pattern 42A3 having the minimum dummy length MDL. Thus, when the RC extraction tool encounters an AA end-to-end distance of 2*SW, it assumes no dummy; and when it encounters a distance greater than or equal to 2*SW+MDL, is assumes there is an A dummy pattern.

Figure 4B:
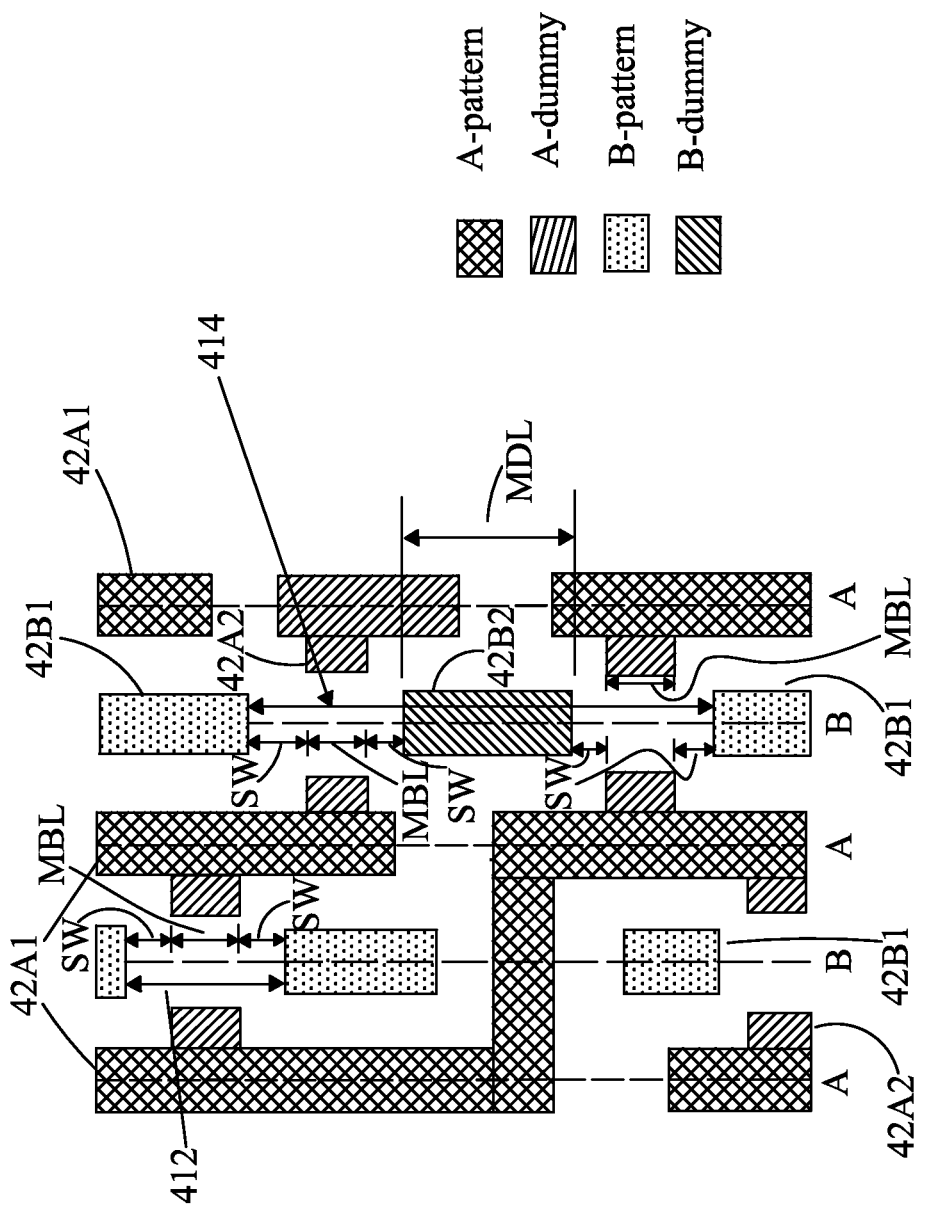
FIG. 4B is a diagram of the calculation of an end-to-end routing rule for B patterns.

FIG. 4B is a diagram showing an SPST routing rule that constrains an end-to-end distance between the second patterns 42B1. Also shown is an SPST routing rule that constrains a minimum length MBL of a perpendicular dummy conductive pattern 42A2, where the perpendicular dummy conductive pattern 42A2 extends perpendicular to and abutting one of the first patterns 42A1, for forming a perpendicular spacer 50*p* (FIG. 2B) to define an end of one of the second patterns 42B1. The minimum length MBL of breaker dummy conductive pattern 42A2 is measured in a direction parallel to the one of the first patterns 42A1.

As shown in FIG. 4B, the SPST routing rules constrain the end-to-end distance between the second patterns 42B1 to be either: a distance 412 which is a sum of twice the width SW of the spacers plus the minimum length MBL of the perpendicular (breaker) dummy conductive pattern 42A2; or greater than or equal to a distance 414 which is a sum of four times a width SW of the spacers plus twice the minimum length MBL of the perpendicular (breaker) dummy conductive pattern plus a minimum permitted length MDL of dummy conductive fill patterns. Thus, when the RC extraction tool encounters a BB end-to-end distance of 2*SW+MBL, it assumes no dummy; and when it encounters a distance greater than or equal to 4*SW+2*MBL+MDL, it assumes there is a B dummy pattern 42B2.

Figure 4C:
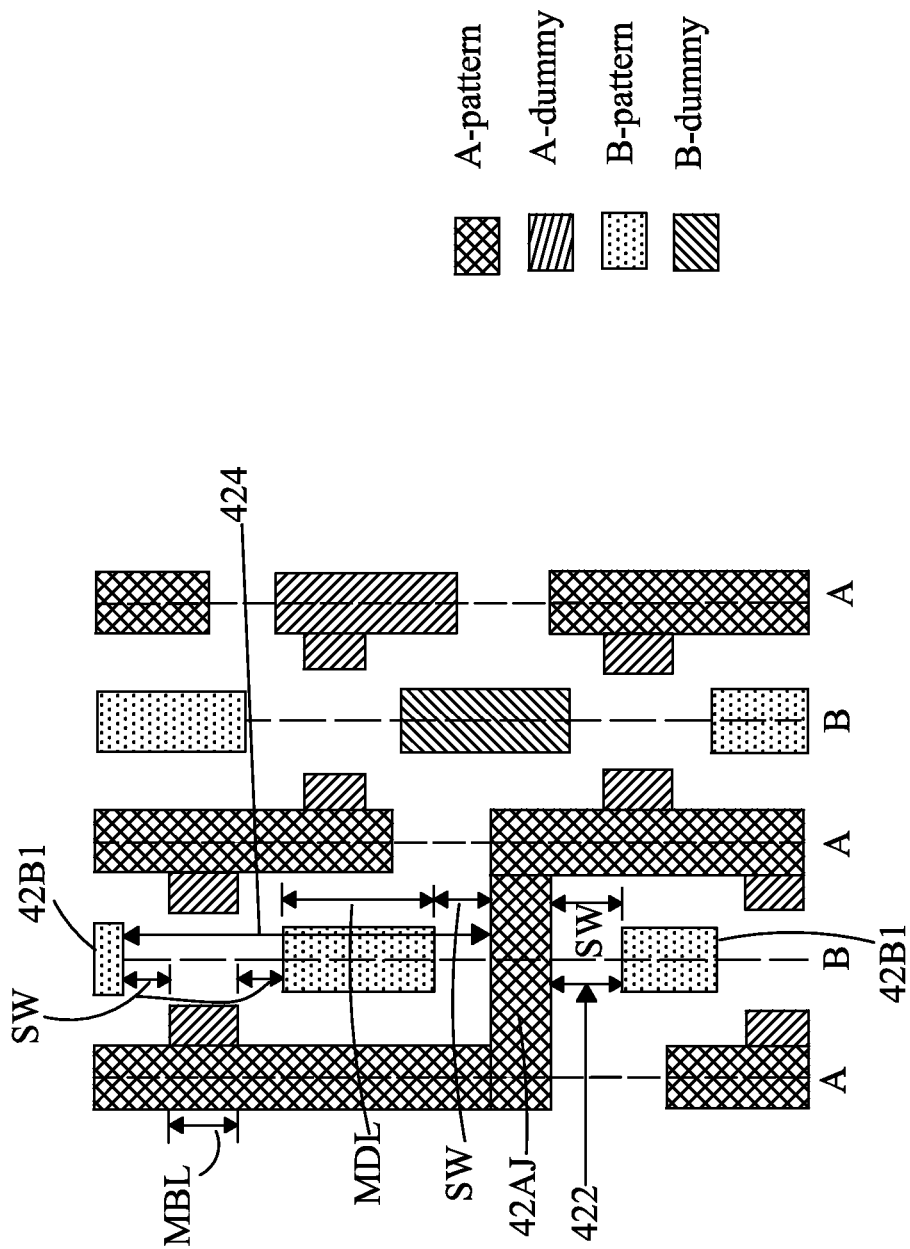
FIG. 4C is a diagram of the calculation of an end-to-jog routing rule for A patterns.

FIG. 4C is a diagram showing an SPST routing rule that constrains an end-to-jog distance between an end of one of the second patterns 42B1 and a jog 42AJ in one of the first patterns to be either: a distance 422 which is a width SW of the spacers; or a distance 424, which is greater than or equal to a sum of three times a width SW of the spacers plus the minimum length MBL of the perpendicular dummy conductive pattern plus a minimum permitted length MDL of dummy conductive fill patterns. Thus, when the RC extraction tool encounters an end-to-jog distance of SW, it assumes no dummy; and when it encounters a distance greater than or equal to 3*SW+MBL+MDL, is assumes there is a B dummy pattern.

FIGS. 4D and 4E show a method for emulating the perpendicular (breaker) dummy conductive fill patterns 42A2 using an RC extraction tool to predict locations and sizes of dummy conductive fill patterns to be added to the preliminary layout of the photomask, without actually laying out the breaker patterns 42A2 within the router. For example, the router provides a layout for the A patterns which includes the desired patterns 42A1 and the longitudinal A dummy patterns 42A2. RC extraction tools include the capability to input etch tables which specify the edge bias of the photolithographic process. The RC extraction tool uses the etch table for simulating edge bias.

FIG. 4D shows a typical application of the etch tables by the RC extraction tool for a space between two A patterns 42A1 and two B patterns 42B1. The etch table indicates to the RC extraction tool that along portions P1, where the A patterns 42A1 and B patterns 42B1 run adjacent to each other, a first etch bias EB1 occurs. Meanwhile, along portion P2, where there is no B pattern 42B1 between the A patterns 42A1 an, a second etch bias EB2 occurs, wherein EB2 is greater than EB1.

FIG. 4E shows graphically how the design rules are configured to input to the RC extraction tool to emulate the perpendicular dummy patterns 42A2. As in FIG. 4D, the region is divided into a first portion P3 having a B pattern 42B1 between the A patterns 42A1, and a second portion P4 having no B pattern 42B1 between the A patterns 42A1. First portion P3 has a length that extends beyond the end of the B pattern 42B1 by the spacer width SW. The second portion P4 has a length that is the BB end-to-end distance minus 2*SW. Thus, the portion P4 has two regions of length SW above and below it, in which there is no B pattern (spacers are to be formed in these regions). Thus, where two B patterns are separated by an end-to-end distance, breakers are to be generated on both of the adjacent A patterns, extending in towards each other. The breakers each extend in by a perpendicular distance of 0.5*SW. The longitudinal length of the breaker is given by the BB end-to-end distance minus 2*SW. The RC extractor is thus able to predict the configuration and RC value of the breaker for the timing analysis.

When the RC extraction tool receives the inputs as described in FIGS. 4A to 4E, it can readily predict the inclusion of the dummy A and dummy B patterns 42A3, 42B2, and the perpendicular dummy conductive patterns 42A2. The RC extraction tool is thus able to provide more accurate RC extraction output data for performing the timing analysis. This reduces or eliminates errors which would be included in the timing analysis if the RC extraction does not account for the dummy patterns 42A2, 42A3 and 42B2.

Figure 5:
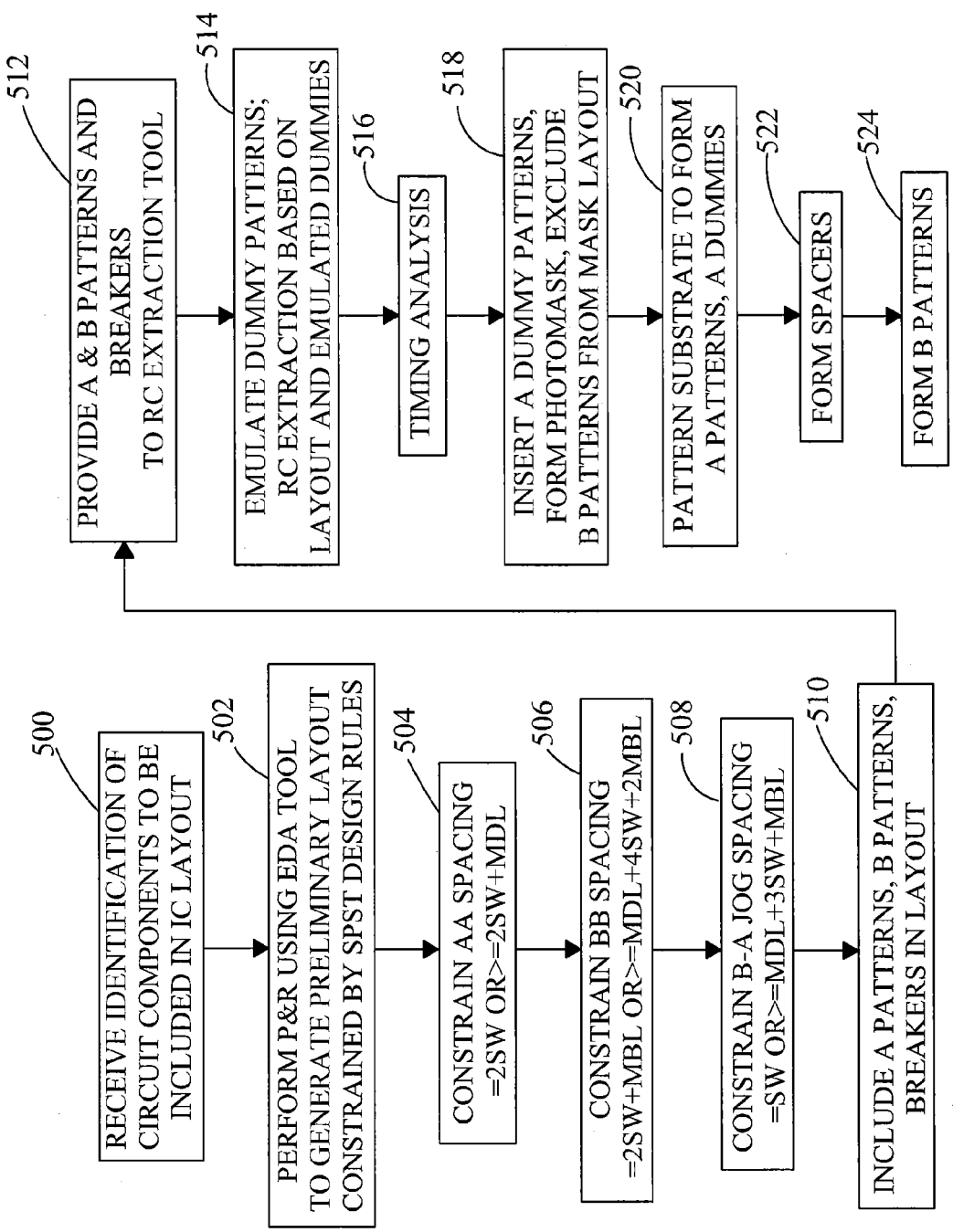
FIG. 5 is a flow chart of a method of laying out a photomask and forming patterns.

FIG. 5 is a flow chart of a method for layout and patterning.

At step 500, the identification of circuit components to be included in the IC layout is received, for example, in the form of a design netlist.

At step 502, placing and routing are performed using an EDA tool, to generate a preliminary layout constrained by the above described SPST design rules. The preliminary layout includes the A patterns 42A1 and B patterns 42B1.

A step 504, the AA end-to-end spacing is constrained to equal either 2*SW or be greater than or equal to 2*SW+MDL.

At step 506, the BB end-to-end spacing is constrained to equal either 2*SW+MBL or be greater than or equal to 4*SW+MDL+2 MBL.

A step 508, the BA end-to-jog spacing is constrained to equal either SW or be greater than or equal to 3*SW+MDL+MBL At step 510, the A patterns 42A1, and the B patterns 42*b*1 are included in a layout.

At step 512, the A patterns, and B patterns, are provided to the RC extraction tool.

At step 514, the dummy patterns are emulated (predicted) within the place and route EDA tool; and the RC extraction is performed to provide an RC timing analysis of the circuit pattern, based on the preliminary layout 42A1, 42B1, predicted dummy patterns 42A3, 42B2 (predicted by RC extraction tool) and the perpendicular dummy conductive fill patterns 42A2 (derived by RC extraction tool based on the special breaker design rule provided).

At step 516, timing analysis is performed based on the RC extraction, which accounts for all the patterns 42A1, 42A2, 42A3, 42B1, and 42B2.

At step 518, the photomask is formed, with the A patterns 42A1 and A dummy patterns 42A2 and 42A3 inserted therein.

At step 520, the substrate is patterned to form the A patterns and A dummies 42A1, 42A2 and 42A3. This may include forming a trench, filling the trench with conductive material, planarizing the substrate by CMP to remove excess conductive material, and etching back part of the ILD to form a step height between the surface of the ILD and the top surface of the conductive material.

At step 522, the spacers 50 are formed abutting the sides of the A patterns 42A1, 42A2 and 42A3 so as to define regions 52 between the spacers. This may include applying a conformal coating of silicon oxide, nitride or oxynitride over the ILD and A patterns, and then performing an anisotropic dry etch, to remove the portions of the conformal coating which overlie the A patterns.

At step 524, the defined regions 52 between the spacers 50 are filled with a conductive material (e.g., copper) to form the second patterns 42B1 and 42B2. The patterns thus formed are more accurately represented by the RC timing analysis, which accommodated all the predicted and emulated dummy patterns.

Figure 6:
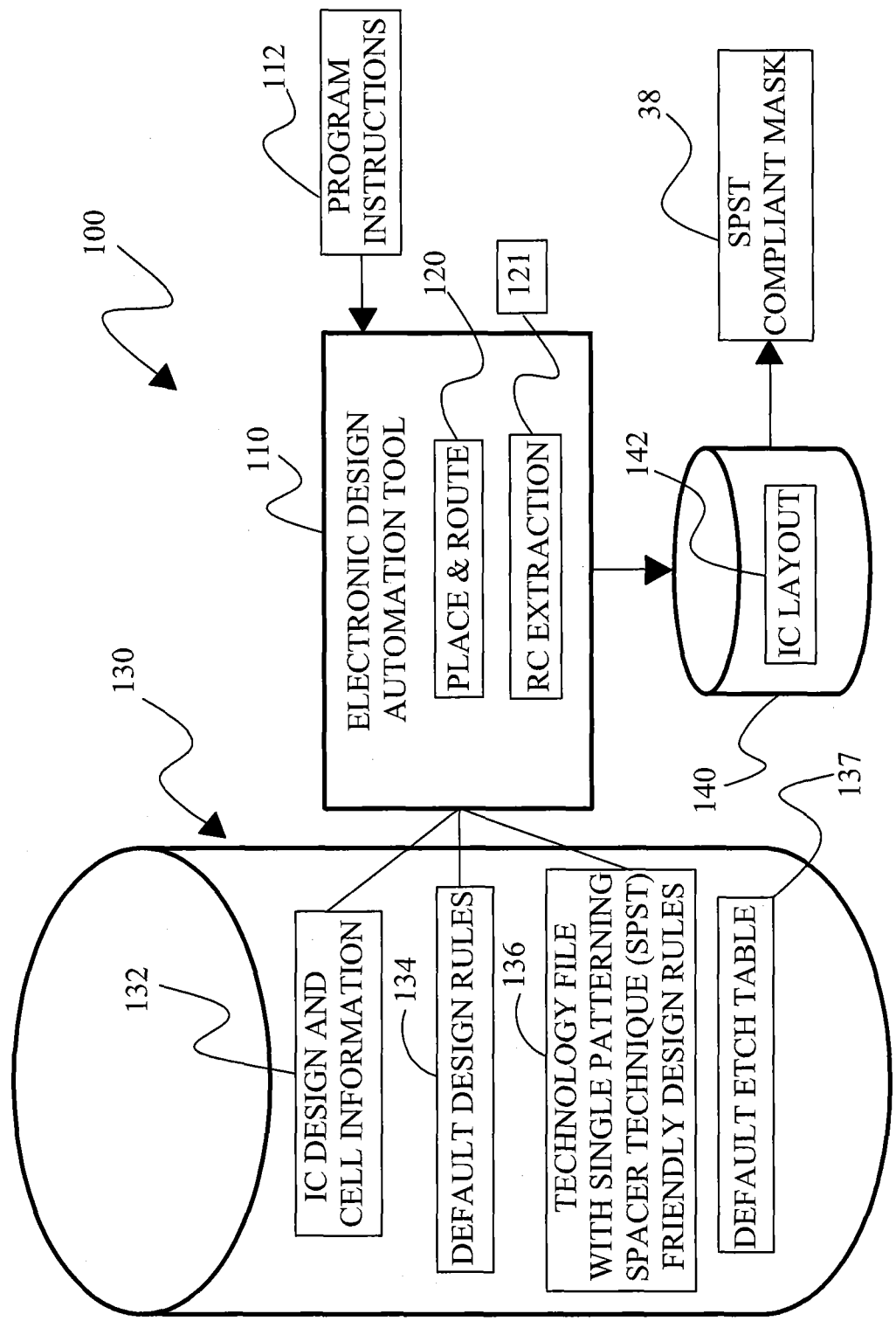
FIG. 6 is a block diagram of a system for performing the method of FIG. 5.

FIG. 6 shows a system 100 for performing a method described above, having an electronic design automation (EDA) tool 110 such as "IC COMPILER"™, sold by Synopsis, Inc. of Mountain View, Calif., including a router 120 such as "ZROUTE"™, also sold by Synopsis. Other EDA tools 110 may be used, such as the "VIRTUOSO" custom design platform or the Cadence "ENCOUNTER"® digital IC design platform may be used, along with the "VIRTUOSO" chip assembly router 120, all sold by Cadence Design Systems, Inc. of San Jose, Calif. The EDA tool 110 is a special purpose computer formed by retrieving stored program instructions from a computer readable storage medium 112 and executing the instructions on a general purpose processor.

The EDA tool includes a place and route tool 120 and an RC extraction tool 121. A tangible machine readable storage medium 130 stores data generated by the place and route tool 120. The data represent a preliminary layout for a photomask to be used to form a circuit pattern of a semiconductor device, the preliminary layout being constrained by a plurality of single patterning spacer technique (SPST) routing rules;

The RC extraction tool 121 is configured to emulate dummy conductive fill patterns 42A2, 42A3, 42B2 by predicting locations and sizes of dummy conductive fill patterns to be added to the preliminary layout of the photomask; and perform RC timing analysis of the circuit pattern 42A1, 42A2, 42A3, 42B1, 42B2, such that the RC timing analysis is performed based on the preliminary layout and the emulated dummy conductive fill patterns.

One or more computer readable storage media 130 are provided to store input data used by the EDA tool 110. The router 120 is capable of receiving an identification of a plurality of cells to be included in an integrated circuit (IC) layout, including a list 132 of pairs of cells within the plurality of cells to be connected to each other.

The router may be equipped with a set of default design rules 134, which may be used for larger technology nodes (e.g., 90 nm), which do not include any B patterns between the A patterns, where the A distance between A patterns is at least equal to the minimum distance for clear patterning using a single mask and single etch.

In addition, a technology file 136 includes SPST friendly design rules as described above with respect to FIGS. 4A to 4C, and etch table 137 as described above with respect to FIGS. 4D and 4E. The SPST routing rules cause alternating first tracks and second tracks to be laid out, and first and second patterns to be laid out along the first and second tracks respectively, such that the first patterns are to be included in the photomask, and the second patterns are to be excluded from the photomask but defined between spacers, the spacers to be formed adjacent the circuit pattern formed using the first patterns of the photomask. Compliance with the SPST routing rules ensures that the layout 42A1, 42B1 generated by the place and route tool 120 can be predictably modified by predictable additions of dummy patterns 42A2, 42A3, 42B2, to form an SPST compliant photomask for the A pattern. The SPST compliant photomask for the A pattern in turn ensures that the B patterns can be formed by forming the spacers 50 between the A patterns and filling the region 52 between the spacers.

The RC extraction tool 121 is configured to use an etch table for simulating edge bias. The system further comprising a second machine readable storage medium portion storing a first etch table 137. The first etch table 137 includes first data for simulating a first edge bias EB2 (FIG. 4D) of the a first portion of one of the first patterns 42A1 between longitudinal locations of two of the second patterns 42B1. The breaker design rule described above enable prediction of a second portion 42A2 of one of the first patterns between longitudinal locations of two of the second patterns, to emulate the perpendicular dummy patterns 42A2.

In the embodiments described above, the design rules predict the configuration and location of the breaker patterns 26A2 during the routing step. In an alternative embodiment (not shown), the breaker patterns 42A2 are emulated by inputting an alternative etch table to the RC extract for use in the sections which will include the breaker patterns. For example, in some embodiments, a first etch table is input to the RC extraction tool including first data for simulating a first edge bias of the a first portion of one of the first patterns adjacent one of the second patterns, and a second etch table is input to the RC extraction tool including second data for simulating a second edge bias of a second portion of one of the first patterns not adjacent to any of the second patterns, wherein the first and second data are different from each other.

In some embodiments, a method comprises performing a place and route operation using a place and route electronic design automation tool 110 to generate a preliminary layout for a photomask 38 to be used to form a circuit pattern 26A of a semiconductor device. The place and route operation is constrained by a plurality of single patterning spacer technique (SPST) routing rules 136. Dummy conductive fill patterns are emulated using an RC extraction engine within the place and route EDA tool to predict locations and sizes of dummy conductive fill patterns to be added to the preliminary layout of the photomask. An RC timing analysis of the circuit pattern is performed within the place and route EDA tool, based on the preliminary layout and the emulated dummy conductive fill patterns.

In some embodiments, a system comprises a tangible machine readable storage medium storing data generated by a place and route tool. The data represent a preliminary layout for a photomask to be used to form a circuit pattern of a semiconductor device. The preliminary layout is constrained by a plurality of single patterning spacer technique (SPST) routing rules. An RC extraction engine within the place and route EDA tool is configured to: emulate dummy conductive fill patterns by predicting locations and sizes of dummy conductive fill patterns to be added to the preliminary layout of the photomask; and perform RC timing analysis of the circuit pattern. The RC timing analysis is performed within the place and route EDA tool based on the preliminary layout and the emulated dummy conductive fill patterns.

Although the subject matter has been described in terms of exemplary embodiments, it is not limited thereto. Rather, the appended claims should be construed broadly, to include other variants and embodiments, which may be made by those skilled in the art.

What is claimed is:

1. An integrated circuit design method, comprising:
performing a place and route operation using a place and route electronic design automation (EDA) tool to generate a preliminary layout for a photomask to be used to form a circuit pattern of a semiconductor device, the place and route operation being constrained by a plurality of single patterning spacer technique (SPST) routing rules, wherein the SPST routing rules cause alternating first tracks and second tracks to be laid out, and first and second patterns to be laid out along the first and second tracks respectively, such that the first patterns are to be included in the photomask, and the second patterns are to be excluded from the photomask but defined between spacers, the spacers to be formed adjacent the circuit pattern formed using the first patterns of the potomask;

emulating dummy conductive fill patterns within the place and route EDA tool to predict locations and sizes of dummy conductive fill patterns to be added to the preliminary layout of the photomask; and performing RC timing analysis of the circuit pattern within the place and route EDA tool, the RC timing analysis being performed based on the preliminary layout and the emulated dummy conductive fill patterns.

2. The integrated circuit design method of claim 1, wherein the SPST routing rules constrain an end-to-end distance between the first patterns to be either:

twice a width of the spacers, or greater than or equal to a sum of twice a width of the spacers plus a minimum permitted length of dummy conductive fill patterns.

3. The integrated circuit design method of claim 1, wherein the SPST routing rules constrain a minimum length of a perpendicular dummy conductive pattern, the perpendicular dummy conductive pattern extending perpendicular to and abutting one of the first patterns, for forming a perpendicular spacer to define an end of one of the second patterns, the minimum length measured in a direction parallel to the one of the first patterns.

4. The integrated circuit design method of claim 3, wherein the SPST routing rules constrain an end-to-end distance between the second patterns to be either:

a sum of twice a width of the spacers plus the minimum length of the perpendicular dummy conductive pattern, or greater than or equal to a sum of four times a width of the spacers plus twice the minimum length of the perpendicular dummy conductive pattern plus a minimum permitted length of dummy conductive fill patterns.

5. The integrated circuit design method of claim 3, wherein the SPST routing rules constrain an end-to-jog distance between an end of one of the second patterns and a jog in one of the first patterns to be either:

a width of the spacers, or greater than or equal to a sum of three times a width of the spacers plus the minimum length of the perpendicular dummy conductive pattern plus a minimum permitted length of dummy conductive fill patterns.

6. The integrated circuit design method of claim 1, wherein the method further comprising inputting an etch table to the RC extraction tool including first data for simulating a first edge bias of a first portion of one of the first patterns between longitudinal locations of two of the second patterns, and inputting a design rule for configuring a second portion of one of the first patterns between longitudinal locations of two of the second patterns, wherein the first and second data are different from each other.

7. The integrated circuit design method of claim 6, wherein:

the SPST routing rules constrain a minimum length of a perpendicular dummy conductive pattern, perpendicular to and abutting one of the first patterns, for forming a perpendicular spacer to define an end of one of the second patterns; and a width of the perpendicular dummy conductive pattern is based on a width of the spacers.

8. The integrated circuit design method of claim 7, wherein a width of the perpendicular dummy conductive pattern is one half of the width of the spacers.

9. The integrated circuit design method of claim 1, further comprising:

inserting the dummy conductive fill patterns into the preliminary layout; and then forming the photomask according to the layout with the dummy conductive fill patterns inserted therein.

10. The integrated circuit design method of claim 9, further comprising:

forming the circuit pattern on a semiconductor substrate using the first patterns of the photomask;

forming spacers abutting the first patterns so as to define regions between the spacers; and filling the defined regions between the spacers with a conductive material to form the second patterns.

11. An integrated circuit design system, comprising:

a tangible machine readable storage medium storing data generated within a place and route electronic design automation (EDA) tool, the data representing a preliminary layout for a photomask to be used to form a circuit pattern of a semiconductor device, the preliminary layout being constrained by a plurality of single patterning spacer technique (SPST) routing rules, wherein the plurality of SPST routing rules cause alternating first tracks and second tracks to be laid out, and first and second patterns to be laid out along the first and second tracks respectively, such that the first patterns are to be included in the photomask, and the second patterns are to be excluded from the photomask but defined between spacers, the spacers to be formed adjacent the circuit pattern formed using the first patterns of the photomask; and the place and route EDA tool configured to:

emulate dummy conductive fill patterns by predicting locations and sizes of dummy conductive fill patterns to be added to the preliminary layout of the photomask; and perform RC timing analysis of the circuit pattern, the RC timing analysis being performed based on the preliminary layout and the emulated dummy conductive fill patterns.

12. The integrated circuit design system of claim 11, wherein the plurality of SPST routing rules constrain an end-to-end distance between the first patterns to be either:

twice a width of the spacers, or greater than or equal to a sum of twice a width of the spacers plus a minimum permitted length of dummy conductive fill patterns.

13. The integrated circuit design system of claim 11, wherein the plurality of SPST routing rules constrain a minimum length of a perpendicular dummy conductive pattern, the perpendicular dummy conductive pattern extending perpendicular to and abutting one of the first patterns, for forming a perpendicular spacer to define an end of one of the second patterns, the minimum length measured in a direction parallel to the one of the first patterns.

14. The integrated circuit design system of claim 13, wherein the plurality of SPST routing rules constrain an end-to-end distance between the second patterns to be either:

a sum of twice a width of the spacers plus the minimum length of the perpendicular dummy conductive pattern, or greater than or equal to a sum of four times a width of the spacers plus twice the minimum length of the perpendicular dummy conductive pattern plus a minimum permitted length of dummy conductive fill patterns.

15. The integrated circuit design system of claim 13, wherein the plurality of SPST routing rules constrain an end-to-jog distance between an end of one of the second patterns and a jog in one of the first patterns to be either:

a width of the spacers, or greater than or equal to a sum of three times a width of the spacers plus the minimum length of the perpendicular dummy conductive pattern plus a minimum permitted length of dummy conductive fill patterns.

16. The integrated circuit design system of claim 11, wherein the system further comprises a second machine readable storage medium portion storing a first etch table, the first etch table including first data for simulating a first edge bias of the a first portion of one of the first patterns adjacent one of the second patterns, and a design rule is provided for simulating a second portion of one of the first patterns not adjacent to any of the second patterns, wherein the first and second data are different from each other.

17. The integrated circuit design system of claim 16, wherein:
   the plurality of SPST routing rules constrain a minimum length of a perpendicular dummy conductive pattern, perpendicular to and abutting one of the first patterns, for forming a perpendicular spacer to define an end of one of the second patterns; and
   a width of the perpendicular dummy conductive pattern is based on a width of the spacers.

18. The integrated circuit design system of claim 17, wherein a second edge bias exceeds the first edge bias by one half of the width of the spacers.

* * * * *

UNITED STATES PATENT AND TRADEMARK OFFICE
CERTIFICATE OF CORRECTION

PATENT NO.        : 8,448,120 B2
APPLICATION NO.   : 13/045839
DATED             : May 21, 2013
INVENTOR(S)       : Cheng-I Huang et al.

It is certified that error appears in the above-identified patent and that said Letters Patent is hereby corrected as shown below:

In the Claims:

Claim 1, Column 11, Line 2, delete "potomask" and insert -- photomask --.

Signed and Sealed this
Twelfth Day of November, 2013

Teresa Stanek Rea
*Deputy Director of the United States Patent and Trademark Office*